(12) United States Patent
Bouvier

(10) Patent No.: US 6,384,667 B1
(45) Date of Patent: May 7, 2002

(54) STABILIZED POWER SUPPLY FOR REMOTELY POWERED ELECTRONIC COMPONENTS

(75) Inventor: Jacky Bouvier, Meylan (FR)

(73) Assignee: France Télécom, Paris (FR)

( * ) Notice: Subject to any disclaimer, the term of this patent is extended or adjusted under 35 U.S.C. 154(b) by 0 days.

(21) Appl. No.: 09/721,497

(22) Filed: Nov. 22, 2000

(30) Foreign Application Priority Data

Nov. 26, 1999  (FR) .............................................. 99 14887

(51) Int. Cl.[7] ................................................. G05F 1/10
(52) U.S. Cl. ........................................ 327/535; 327/540
(58) Field of Search ........................... 23/312, 313, 314, 23/315, 316; 327/534, 535, 536, 537, 538, 540, 541, 543, 545, 546

(56) References Cited

U.S. PATENT DOCUMENTS 5,804,811 A * 9/1998 Saitoh et al. ................ 235/492
6,134,130 A * 10/2000 Connell et al. ............... 363/89

FOREIGN PATENT DOCUMENTS

| FR | 2 774 492 | 8/1999 |
|----|-----------|--------|
| FR | 2 776 410 | 9/1999 |
| GB | 2 321 726 | 8/1998 |

* cited by examiner

*Primary Examiner*—Jeffrey Zweizig
(74) *Attorney, Agent, or Firm*—Eric B. Meyertons; Conley, Rose & Tayon, P.C.

(57) ABSTRACT

The invention relates to a stabilized power supply device for an assembly of remotely powered electronic components, for which the supply and the data transmission take place on the same channel. The device includes an electronic module which is interposed between the supply channel and the assembly of electronic circuits, supplies the said assembly of electronic components with a variable current in order for the proper operation of the said assembly of electronic components to be satisfied, and consumes a constant current in order to allow effective data transmission.

23 Claims, 2 Drawing Sheets

STABILIZED POWER SUPPLY FOR REMOTELY POWERED ELECTRONIC COMPONENTS

BACKGROUND OF THE INVENTION

1. Field of the Invention

The present invention generally relates to the supply of remotely controlled electronic components and especially, but not exclusively, to non-contact smart cards, that is to say cards communicating remotely with a terminal, and for which the transmission of the data on the card to the terminal is conventionally done by absorption modulation. One particular application of the invention relates to non-contact smart cards called "close coupling" smart cards which may also be introduced into a reader.

Non-contact smart cards are also supplied via the same channel as that used for the data transmission. In practice, the chip on the card includes an inductive interface, such as a coil, interacting with a coil of the remote terminal. The decoding of the data transmitted from the card by absorption modulation includes measuring, at the coil of the terminal, the voltage variations corresponding to the data transmitted and generated by the modulation means of the chip.

2. Description of the Relevant Art

At the present time, the number of integrated functions on the same electronic chip is constantly changing. Increasing the number of functions means increasing the number of transistors used and significantly increasing the amount of power consumed. As a result therefore, during operation of the electronic components of the chip, there are large variations in current consumed or absorbed. These variations in the current consumed induce currents in the coil of the chip which are mixed with the actual modulation current. The voltage variations obtained at the coil of the terminal then comprise not only the voltage variations generated by the absorption modulation but also these "spurious" voltage variations caused by the variations in the consumption of the electronic components of the chip. The decoding of the information transmitted is then disturbed and the data transmission may even, in the worst possible case, be interrupted.

SUMMARY OF THE INVENTION

In one embodiment a card is configured to prevent the variations in current absorbed by the electronic components of the chip from disturbing the data transmission and to obtain reliable data transmission whatever the variations in the current consumed by the remotely powered integrated circuits.

In one embodiment, a stabilized power supply device for an assembly of remotely powered electronic components, for which the supply and the data transmission take place on the same channel via an inductive interface such as a coil is provided. The device includes an electronic module which, interposed between the inductive interface and the assembly of electronic components, supplies the assembly of electronic components with a variable current, that is to say one which may vary depending on the variations in consumption by the electronic components, so as to ensure that the proper operation of these electronic components is satisfied, and consumes a constant current, so as to allow effective data transmission.

According to one embodiment, the electronic module includes a current generator delivering a constant current and a constant-voltage shunting means (or shunt) (for example, an n-MOS transistor biased by a resistance bridge) connected in parallel with the assembly of electronic components.

Advantageously, the constant current delivered by the current generator is at least equal to the maximum current consumed by the assembly of electronic components.

The constant current generator may be controlled by a reference circuit by means of a constant voltage.

Preferably, the electronic module includes two filtering capacitors so as to remove the high-frequency signals.

The interface includes a coil connected to a full-wave rectifier, the coil being the seat of a voltage induced by the magnitude field of a remote inductor (for example, the coil of the terminal communicating with the smart card).

BRIEF DESCRIPTION OF THE DRAWINGS

Further advantages and features of the invention will appear upon examining the detailed description of an entirely non-limiting embodiment and from the appended drawings, in which.

DETAILED DESCRIPTION OF THE PREFERRED EMBODIMENTS

A device produced on a smart card including, as a main electronic component, an asynchronous-logic microcontroller, will now be described, although the device is not limited thereby. This is because an asynchronous-logic microcontroller exhibits, as characteristic, large variations in absorbed power.

Figure 1:
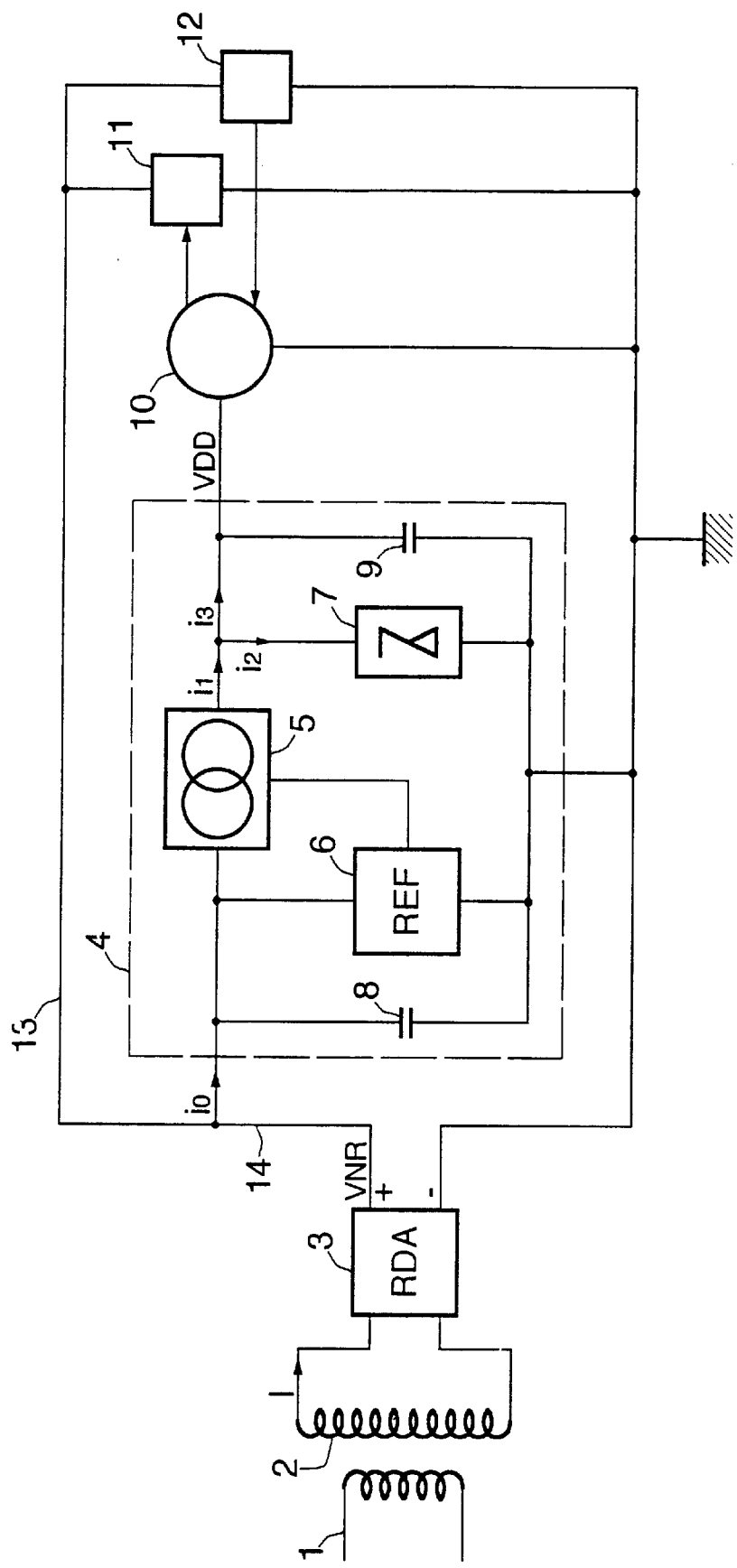
FIG. 1 is a simplified electronic diagram of a device according to the invention.

Referring to FIG. 1, the coil 1 is an inductor present in a remote terminal. The coil 1 creates a magnetic field. The other elements illustrated in FIG. 1 form part of the chip. The coil 2 supplies the elements of the chip with the induced voltage which arises when the coil 2 is in the magnetic field created by the coil 1. This induced voltage delivers the current I consumed by the chip. A full-wave rectifier 3 provides a voltage VNR from the radiofrequency alternating voltage present at the terminals of the coil 2.

The induced voltage at the terminals of the inductor 1 is of the form:

$$V = M\omega I,$$

where M is the mutual inductance between the coil 2 and the inductor 1 and or $\omega = 2\pi f$ is the angular frequency (f being the frequency), The voltage $V = M\omega I$ corresponds to the voltage present when no data is transmitted from the card to the terminal.

The inductive interface having the coil 2 and the full-wave rectifier 3 makes it possible not only to supply the chip but also to transmit data from the card to the terminal and from the terminal to the card.

The microcontroller 10 is the main electronic circuit of the smart card. The microcontroller 10 may exchange data with the terminal using data modulation means 11 and data demodulation means 12. The demodulation means 12 is used to receive data emitted by the terminal. The data transmission from the terminal to the chip takes place via amplitude modulation of the magnetic field. The data modulation means 11 is used to transmit data to the terminal via the technique of absorption modulation of a phase-modulated subcarrier, which technique is known to those skilled in the art.

An electronic module 4 is placed between the microcontroller 10 and the full-wave rectifier 3. The electronic module 4 accepts, at its input, a constant current $i_0$ and supplies the microcontroller 10 with a current $i_3$ which varies as a function of the consumption of the said microcontroller 10.

The electronic module 4 comprises a current generator 5 imposing a constant current $i_1$ on its branch, a constant-voltage shunt 7 (for example, an n-MOS transistor biased on its gate by a resistance bridge) and a reference means 6 delivering reference currents for biasing the current generator. The electronic module 4 also comprises two filtering capacitors 8 and 9 preventing high-frequency signals from disturbing the operation of the said electronic module 4.

The shunt imposes on the terminals of the microcontroller 10 a stabilized voltage VDD equal to the value required for the proper operation of the said microcontroller 10.

The voltage VNR supplies the demodulation means, the modulation means and the reference means 6. One of the outputs of the reference means 6 provides reference currents for biasing the current generator 5.

The current generator 5 delivers a constant current $i_1$ which is determined so as to be equal to the maximum current that can be absorbed by the microcontroller 10. To satisfy the fluctuations in current absorbed by the microcontroller 10, the constant current $i_1$ is divided into two parts, a part $i_3$ supplying the microcontroller 10 and a part $i_2$ supplying the shunt 7. The currents $i_2$ and $i_3$ vary in opposite directions. When $i_2$ increases, $i_3$ decreases. When $i_2$ decreases, $i_3$ increases. Thus, the variations in the current absorbed by the microcontroller have no effect on $i_1$ and therefore on $i_0$, which remains constant:

$$i_1=i_2+i_3=\text{constant.}$$

In other words, the current variations in the microcontroller are not transmitted to the voltage VNR and do not disturb the modulation and demodulation means.

When the microcontroller requires to transmit data to the terminal, this data is transmitted to the modulator 11, the latter in turn transmitting all the data to the full-wave rectifier 3 in the form of a current variation δi through the branches 13 and 14 located between the modulator 11 and the positive terminal of the full-wave rectifier 3. Next, the variation δi is transmitted to the coil 2 and the voltage induced at the terminals of the inductor 1 becomes:

$$V=M\omega(I+\delta i)$$

Since the term MωI is an almost constant term, containing no data information, it has an almost fixed value. It is therefore possible to detect, in the terminal, the modulation which corresponds to the data transmitted and is generated by the term δi. Since the current $i_0$ is constant and is not a source of variations able to be caused by the operation of the microcontroller 10, the data transmission from the card to the terminal is not disturbed.

Although the transmission in the direction from the terminal to the smart card is less of a problem, since the transmission takes place by amplitude modulation of a 10%-modulated 13 megahertz carrier 13, the module 4 according to the invention acts favorably in the same way by isolating the power absorbed by the microcontroller from the data transmission. Thus, whatever the direction of transmission, the microcontroller may continue to execute its program simultaneously with the data transmission.

Indicated in FIGS. 2 to 5 are the geometries of the transistors in 0.25 micron technology.

Figure 2:
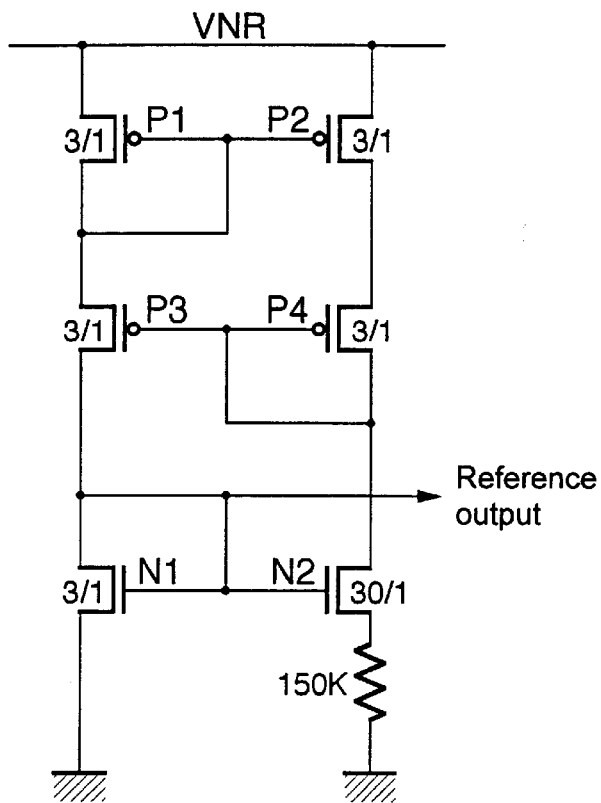
FIG. 2 is a schematic representation of a voltage reference means of the device of FIG. 1.

FIG. 2 shows in detail the reference means 6. This means is known to those skilled in the art and mainly comprises six transistors, four identical p-MOS transistors (P1, P2, P3 and P4) having a length equal to one micron and a width equal to three microns, and two n-MOS transistors, N1 and N2, the gates of which are connected together. The length of the transistor N1 is equal to one micron and its width is equal to three microns. The length of the transistor N2 is equal to one micron and its width is equal to thirty microns. The voltage reference means also has a 150 kΩ resistor placed between the transistor N2 and earth.

The output of the reference means 6 is effected on the gate of N1 and of N2 and is connected to the drain of N1. The output voltage is constant and is determined according to the dimensions of the components (transistors and resistor) used.

Figure 3:
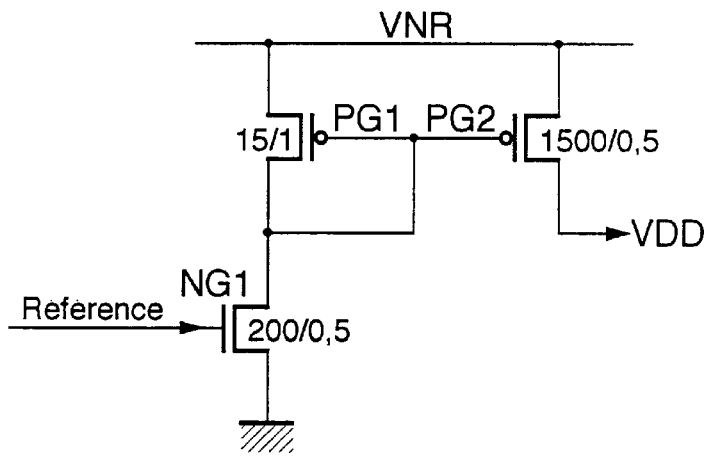
FIG. 3 is a schematic representation of a current generator of the device of FIG. 1.

FIG. 3 shows in detail the constant current generator 5 controlled by the reference currents output by the reference means 6. The current generator is a device comprising two p-MOS transistors (PG1 and PG2) connected together via their gate and an n-MOS transistor NG1, the drain of which is connected to the gate and to the drain of PG1. The length of the transistor PG1 is equal to one micron and its width is equal to 15 microns. The length of the transistor PG2 is equal to 0.5 microns and its width is equal to 1500 microns. The output voltage of the reference means 6 supplies the gate of NG1. The output of the current generator 5 is effected via the drain of PG2.

Figure 4:
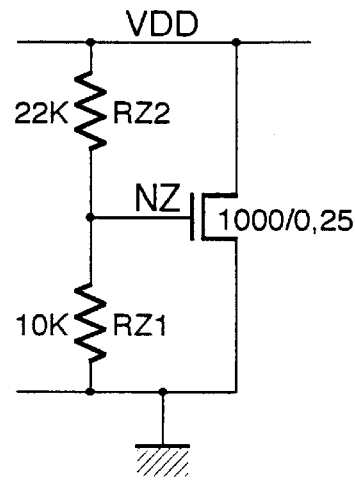
FIG. 4 is a schematic representation of a constant-voltage shunt of the device of FIG. 1.
Figure 5:
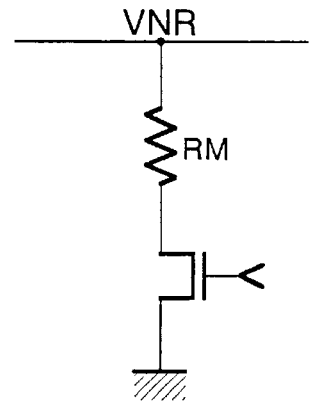
FIG. 5 is a schematic representation of the modulation means of the device of FIG. 1.

FIG. 4 shows the shunt means 7 composed of an n-MOS transistor (NZ) biased by a resistance bridge RZI and RZ2 on the gate of the n-MOS transistor. The value of the stabilized voltage depends on the threshold voltage of the said n-MOS transistor and on the value of the ratio RZ2/RZI of the resistors RZ2 and RZI. RZI is equal to 22 kΩ, RZ2 is equal to 10 kΩ and the width/length ratio of the transistor NZ is equal to 1000/0.25, FIG. 5 shows the modulation means allowing data to be sent to the terminal using the technique of absorption modulation of a phase-modulated subcarrier. The modulation means comprise an n-MOS transistor and a resistor RM. The phase-modulated subcarrier (the data coming from the microcontroller 10) controls the gate of the n-MOS transistor and thus creates the variation δi of the current in the resistor RM connected to the voltage VNR.

With the features of the voltage reference means 6, of the current generator 5 and of the shunt 7 which are indicated above, the current delivered by the current generator 5 is 14 mA and the stabilized voltage supplying the microcontroller 10 is 2 volts.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A stabilized power supply device for an assembly of remotely powered electronic components, for which the supply and the data transmission take place on the same channel via an inductive interface, comprising an electronic module which is interposed between the inductive interface and the assembly of electronic components, the electronic module configured to supply the assembly of electronic components with a variable current and wherein the electronic module consumes a constant current.

2. The device of claim 1 wherein the electronic module comprises a current generator delivering a constant current and a constant-voltage shunt connected in parallel with the assembly of electronic components.

3. The device of claim 2 wherein the constant current delivered by the current generator is at least equal to a maximum current consumed by the assembly of electronic components.

4. The device of claim 2 wherein the constant-voltage shunt is an n-MOS transistor biased by a resistance bridge.

5. The device of claim 2 wherein the current generator is controlled by a reference circuit configured to produce a constant voltage.

6. The device of claim 1 wherein the electronic module comprises two filtering capacitors.

7. The device of claim 1 wherein the inductive interface comprises a coil coupled to a full-wave rectifier.

8. The device of claim 5, wherein the reference circuit comprises a plurality of p-MOS transistors coupled to a plurality of n-MOS transistors, wherein the output voltage of the reference circuit is predetermined according to the dimensions of the p-MOS and the n-MOS transistors.

9. The device of claim 8, wherein the p-MOS transistors have substantially identical dimensions.

10. The device of claim 8, wherein the dimensions of the n-MOS transistors have substantially different dimensions.

11. The device of claim 1, wherein the constant current generator comprises a plurality of p-MOS transistors coupled to at least one n-MOS transistor.

12. The device of claim 3 wherein the constant-voltage shunt is an n-MOS transistor biased by a resistance bridge.

13. The device of claim 3 wherein the current generator is controlled by a reference circuit configured to produce a constant voltage.

14. The device of claim 4 wherein the current generator is controlled by a reference circuit configured to produce a constant voltage.

15. The device of claim 2 wherein the electronic module comprises two filtering capacitors.

16. The device of claim 3 wherein the electronic module comprises two filtering capacitors.

17. The device of claim 4 wherein the electronic module comprises two filtering capacitors.

18. The device of claim 5 wherein the electronic module comprises two filtering capacitors.

19. The device of claim 2 wherein the inductive interface comprises a coil coupled to a full-wave rectifier.

20. The device of claim 3 wherein the inductive interface comprises a coil coupled to a full-wave rectifier.

21. The device of claim 4 wherein the inductive interface comprises a coil coupled to a full-wave rectifier.

22. The device of claim 5 wherein the inductive interface comprises a coil coupled to a full-wave rectifier.

23. The device of claim 6 wherein the inductive interface comprises a coil coupled to a full-wave rectifier.

* * * * *